(12) United States Patent
Obeid et al.

(10) Patent No.: US 11,289,777 B2
(45) Date of Patent: Mar. 29, 2022

(54) BUSBAR RETAINER CLIPS

(71) Applicant: FORD GLOBAL TECHNOLOGIES, LLC, Dearborn, MI (US)

(72) Inventors: Tarek Obeid, Dearborn Heights, MI (US); Mike Hamzeh, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 221 days.

(21) Appl. No.: 16/711,905

(22) Filed: Dec. 12, 2019

(65) Prior Publication Data

US 2021/0184197 A1 Jun. 17, 2021

(51) Int. Cl.
*H01M 50/502* (2021.01)
*H01M 50/20* (2021.01)

(52) U.S. Cl.
CPC ......... *H01M 50/502* (2021.01); *H01M 50/20* (2021.01); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,315,132 A * | 4/1967 | Lucas | ..................... | H02G 5/025 361/829 |
| 3,427,396 A * | 2/1969 | Giger, Jr. | ................. | H02G 5/06 174/68.2 |
| 4,929,801 A * | 5/1990 | Hibbert | .................... | H02G 5/06 174/16.2 |
| 5,785,542 A * | 7/1998 | Johnson | ............... | H01R 25/162 439/210 |
| 6,265,666 B1 * | 7/2001 | Faulkner | .................. | H02G 5/06 174/70 B |
| 9,698,402 B2 | 7/2017 | Gunther et al. | | |
| 2009/0075163 A1 | 3/2009 | Shevock et al. | | |
| 2011/0290558 A1 * | 12/2011 | Jur | ........................... | H02G 5/06 174/99 B |
| 2013/0126204 A1 * | 5/2013 | Nohara | ................ | H01H 85/044 174/50 |
| 2016/0336688 A1 * | 11/2016 | Yanli | ..................... | H05K 7/1492 |
| 2017/0298909 A1 * | 10/2017 | Alefelder | ................ | H02G 5/06 |
| 2020/0176739 A1 * | 6/2020 | You | ..................... | H01M 50/502 |

FOREIGN PATENT DOCUMENTS

| CN | 203070800 | * | 1/2013 | ............... H01B 7/02 |
|---|---|---|---|---|
| CN | 103715642 A | | 4/2014 | |
| CN | 209395626 U | | 9/2019 | |

OTHER PUBLICATIONS

Machine English translation of CN203070800 (Year: 2013).*

* cited by examiner

*Primary Examiner* — Michael L Dignan
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack may include one or more busbar retainer clips adapted for securing busbars within the battery pack. The retainer clips may secure the busbars in a manner that prevents material contact between the busbars and surrounding enclosure surfaces and substantially reduces any noise, vibration, and harshness issues.

11 Claims, 5 Drawing Sheets

BUSBAR RETAINER CLIPS

TECHNICAL FIELD

This disclosure relates generally to electrified vehicle battery packs, and more particularly to busbar assemblies that include retainer clips for securing busbars within battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery arrays that each include groupings of battery cells for powering the electric propulsion of electrified vehicles. Adjacent battery arrays must be reliably connected to one another in order to achieve the voltage and power levels necessary to propel the vehicle.

SUMMARY

A battery pack according to an exemplary aspect of the present disclosure includes, among other things, an enclosure assembly including a tray and a cover, a battery array housed within the enclosure assembly, a busbar positioned relative to the battery array, and a retainer clip including a pair of retention legs that receive the busbar, a first positioning leg that contacts the cover, and a second positioning leg that contacts the battery array.

In a further non-limiting embodiment of the foregoing battery pack, the busbar is a copper busbar having a silicone cover.

In a further non-limiting embodiment of either of the foregoing battery packs, the retainer clip is made of a thermoplastic material.

In a further non-limiting embodiment of any of the foregoing battery packs, the thermoplastic material includes nylon.

In a further non-limiting embodiment of any of the foregoing battery packs, the retainer clip includes a base, and the pair of retention legs protrude perpendicularly from the base and the first and second positioning legs protrude transversely from the base.

In a further non-limiting embodiment of any of the foregoing battery packs, a handle protrudes from the base in a direction opposite from the pair of retention legs and the first and second positioning legs.

In a further non-limiting embodiment of any of the foregoing battery packs, the retainer clip is secured to the busbar by a tape.

In a further non-limiting embodiment of any of the foregoing battery packs, the tape is an abrasion-resistant tape made from polyurethane, fiberglass, or polyethylene.

In a further non-limiting embodiment of any of the foregoing battery packs, a tongue of the retainer clip is held against the busbar by the tape.

In a further non-limiting embodiment of any of the foregoing battery packs, each retention leg of the pair of retention legs includes an outer gripping head having a curved surface that extends about at least a portion of an outer circumference of the busbar.

A battery pack according to another exemplary aspect of the present disclosure includes, among other things, a first battery array, a second battery array, and a busbar assembly configured to electrically connect the first and second battery arrays. The busbar assembly includes a first terminal cap, a second terminal cap, a busbar extending between the first and second terminal caps, and a retainer clip affixed to the busbar and configured to secure the busbar relative to the first and second battery arrays.

In a further non-limiting embodiment of the foregoing battery pack, the retainer clip is made of a thermoplastic material.

In a further non-limiting embodiment of either of the foregoing battery packs, the thermoplastic material includes nylon.

In a further non-limiting embodiment of any of the foregoing battery packs, the retainer clip is secured to the busbar by an abrasion-resistant tape.

In a further non-limiting embodiment of any of the foregoing battery packs, the busbar is received between a pair of retainer legs of the retainer clip.

In a further non-limiting embodiment of any of the foregoing battery packs, the pair of retainer legs are flanked by a first positioning leg and a second positioning leg of the retainer clip.

In a further non-limiting embodiment of any of the foregoing battery packs, the first positioning leg is in abutting contact with an enclosure assembly that houses the first and second battery arrays and the second positioning leg is in abutting contact with the first battery array.

In a further non-limiting embodiment of any of the foregoing battery packs, a first terminal extends between the first terminal cap and a positive terminal of the first battery array, and a second terminal extends between the second terminal cap and a negative terminal of the second battery array.

In a further non-limiting embodiment of any of the foregoing battery packs, a second retainer clip is affixed to the busbar and is configured to secure the busbar relative to the first and second battery arrays.

In a further non-limiting embodiment of any of the foregoing battery packs, the busbar assembly is part of an electrical distribution system (EDS) of the battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may include one or more busbar retainer clips adapted for securing busbars within the battery pack. The retainer clips may secure the busbars in a manner that prevents material contact between the busbars and surrounding enclosure surfaces and substantially reduces any noise, vibration, and harshness issues. These and other features are discussed in greater detail in the following paragraphs of this detailed description.

Figure 1:
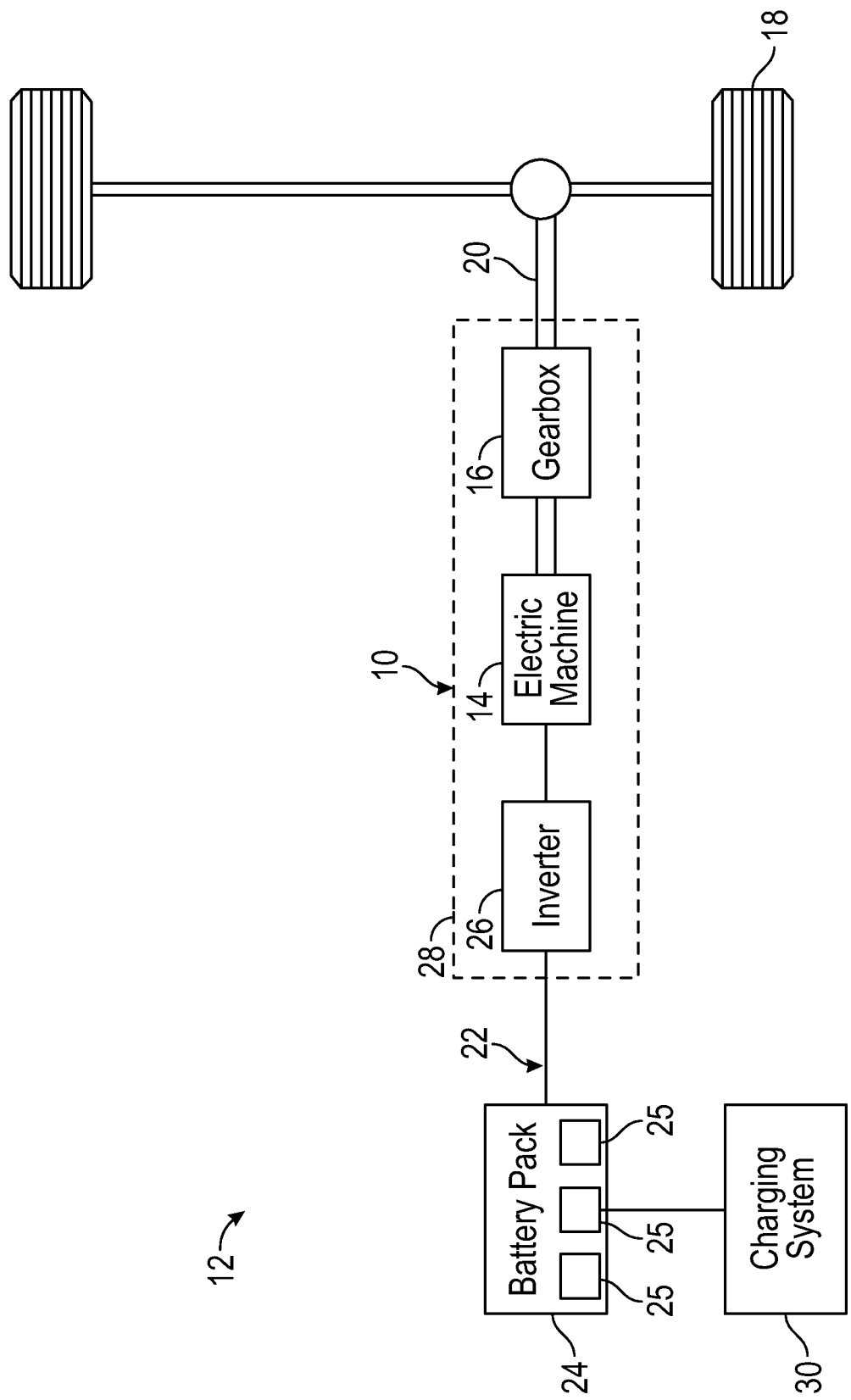
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26, which can also be referred to as an inverter system controller (ISC). The electric machine 14, the gearbox 16, and the inverter 26 may be collectively referred to as a transmission 28 of the electrified vehicle 12.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also be equipped with a charging system 30 for charging the energy storage devices (e.g., battery cells) of the battery pack 24. The charging system 30 may include charging components that are located both onboard the electrified vehicle 12 (e.g. vehicle inlet assembly, etc.) and external to the electrified vehicle 12 (e.g., electric vehicle supply equipment (EVSE), etc.). The charging system 30 can be connected to an external power source (e.g., a wall outlet, a charging station, etc.) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

Figure 2:
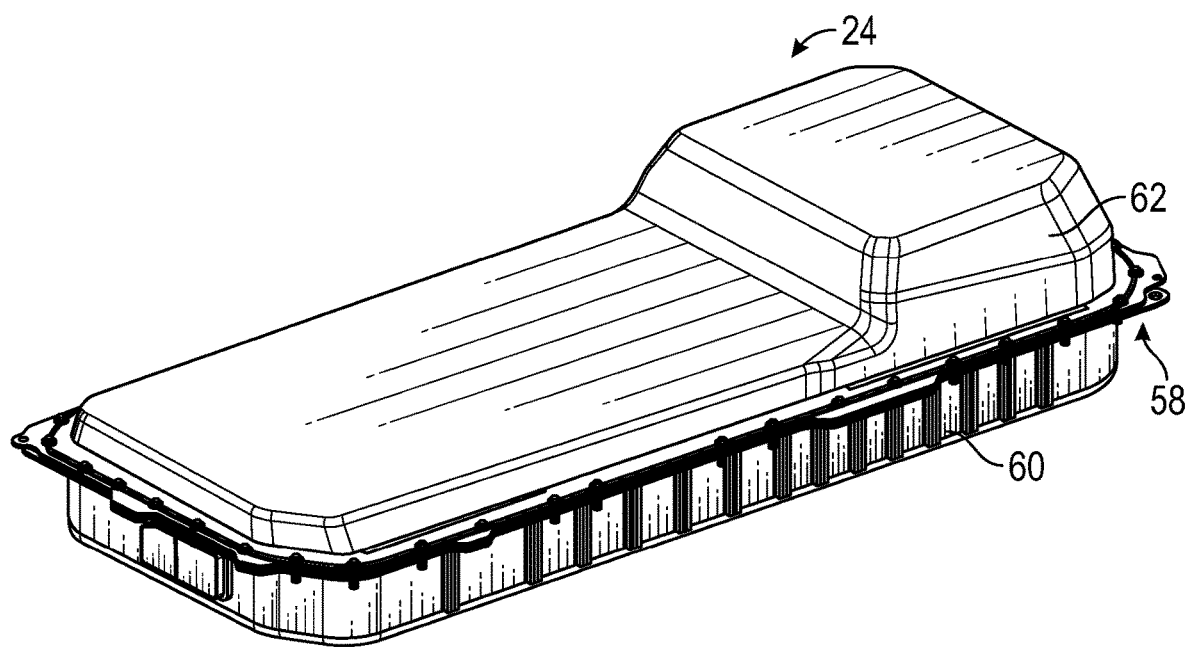
FIG. 2 illustrates a battery pack of an electrified vehicle.
Figure 3:
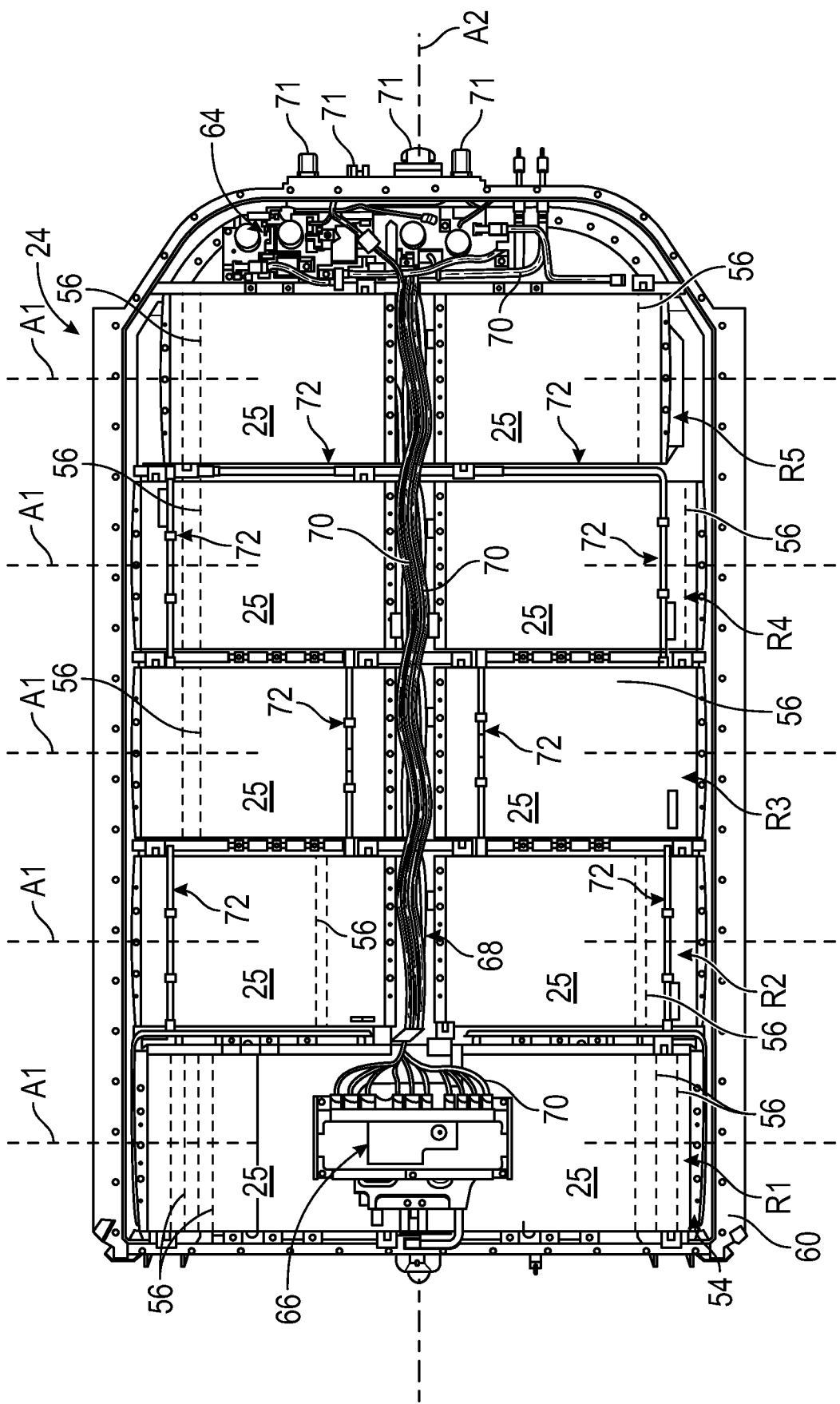
FIG. 3 illustrates a battery system of the battery pack of FIG. 2. A cover of an enclosure assembly of the battery pack is removed in FIG. 3 to better illustrate certain components of the battery system.

FIGS. 2-3 schematically illustrate a battery pack 24 that can be employed within an electrified vehicle. For example, the battery pack 24 could be incorporated as part of the powertrain 10 of the electrified vehicle 12 of FIG. 1. FIG. 2 is an assembled, perspective view of the battery pack 24, and portions (e.g., a cover 62) of the battery pack 24 are removed in FIG. 3 in order to better visualize its internal contents.

The battery pack 24 may include a battery system 54 (best shown in FIG. 3) housed within an enclosure assembly 58. The enclosure assembly 58 may be a sealed enclosure and may embody any size, shape, and configuration within the scope of this disclosure. In an embodiment, the enclosure assembly 58 includes a tray 60 and a cover 62. During assembly, the battery system 54 may be positioned within the tray 60, and the cover 62 may then be fixedly secured to the tray 60 to seal the battery system 54 therein. The tray 60 and the cover 62 may be made of any material or combination of materials, including metallic and/or polymeric materials.

The battery system 54 includes a plurality of battery cells 56 that store energy for powering various electrical loads of the electrified vehicle 12. The battery system 54 could include any number of battery cells 56 within the scope of this disclosure. Therefore, this disclosure is not limited to the exact configuration of the battery system 54 shown in FIG. 3.

The battery cells 56 of the battery system 54 may be stacked side-by-side to construct a grouping of battery cells 56, sometimes referred to as a battery array. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery system 54 depicted in FIG. 3 includes a plurality of adjacent rows R1-R5 of battery arrays 25. Although the battery system 54 is depicted as including two battery arrays within each row R1-R5 for a total of ten battery arrays, the battery pack 24 could include a greater or fewer number of battery arrays and still fall within the scope of this disclosure. Unless stated otherwise herein, reference numeral "25" may refer to any of the battery arrays 25 of the rows R1 to R5.

Each row R1 to R5 of the battery arrays 25 may be distributed along a longitudinal axis A1. In an embodiment, the longitudinal axes A1 of the rows R1 to R5 are transverse, or even perpendicular, relative to a longitudinal axis A2 of the tray 60. However, other arrangements and configurations of the battery arrays 25 are also contemplated within the scope of this disclosure.

The battery system 54 may include a plurality of electrical components (see features 64-71) that establish an electrical assembly of the battery system 54. The electrical components may include, but are not limited to, a bussed electrical center (BEC) 64, a battery electric control module (BECM)

66, an electrical distribution system (EDS) 68, which may include one or more wiring harnesses 70, a plurality of input/output (I/O) connectors 71, etc.

The battery arrays 25 of the battery system 54 must be reliably electrically connected to one another in order to achieve the voltage and power levels necessary to achieve electric propulsion of the electrified vehicle 12. The EDS 68 may therefore include one or more busbar assemblies 72 for electrically connecting adjacent battery arrays 25 of the battery system 54.

Figure 4:
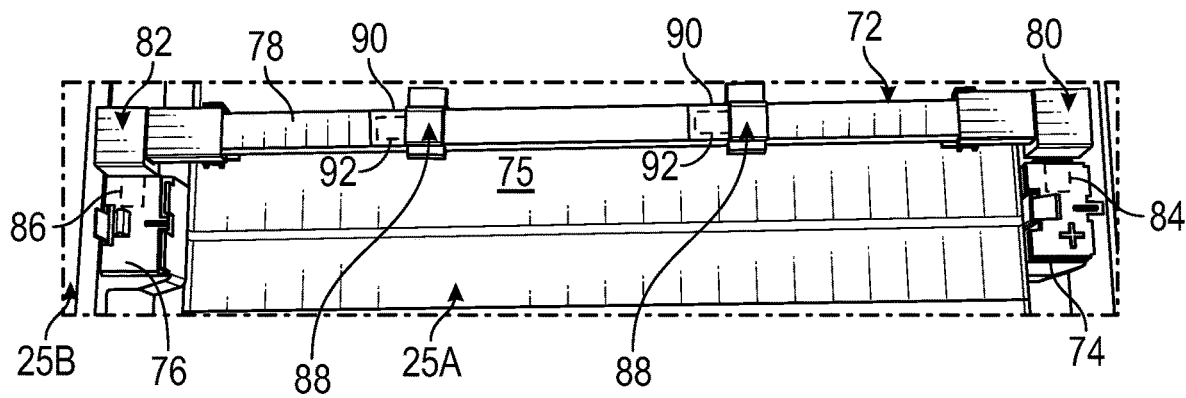
FIG. 4 illustrates an exemplary busbar assembly of the battery system of FIG. 3.

FIG. 4 illustrates an exemplary busbar assembly 72 of the EDS 68 shown in FIG. 3. The busbar assembly 72 may be secured on an upper surface 75 (i.e., a surface that faces the cover 62 and is opposite from the surface received against the tray 60) of a battery array 25A for connecting a positive terminal 74 of the battery array 25A to a negative terminal 76 of an adjacent battery array 25B. Additional battery arrays 25 of the battery system 54 discussed above could be electrically connected in similar manner by using additional busbar assemblies 72.

The busbar assembly 72 may include a busbar 78 that extends between a first terminal cap 80 and a second terminal cap 82. In an embodiment, the busbar 78 is a copper busbar that is covered by a silicone cover. However, other busbar configurations are also contemplated within the scope of this disclosure. A first terminal 84 of the busbar assembly 72 may connect between the first terminal cap 80 and the positive terminal 74 of the battery array 25A, and a second terminal 86 of the busbar assembly 72 may connect between the second terminal cap 82 and the negative terminal 76 of the battery array 25B for electrically connecting the battery arrays 25A, 25B.

Due at least in part to the relatively large distance the busbar 78 spans between the first and second terminal caps 80, 82, the busbar 78 may vibrate during vehicle operation. Vibration of the busbar 78 can lead to undesirable side effects such as squeak, rattle, and excess noise. Furthermore, if the vibration becomes significant enough, the busbar 78 could move into material contact with an inner surface 87 of the cover 62 (see FIG. 5), thereby potentially hindering functionality of the busbar assembly 72. This disclosure therefore proposes busbar assemblies 72 that are equipped with one or more retainer clips 88 for securing the busbar 78 in a manner that substantially reduces the potential for noise, vibration, and harshness issues.

In an embodiment, the busbar assembly 72 includes two retainer clips 88. However, a greater or fewer number of retainer clips 88 may be utilized depending on the length of the busbar 78, among other factors.

Each retainer clip 88 may be securely affixed relative to the busbar 78 by a tape 90. The tape 90 may be an abrasion-resistant tape made from polyurethane, fiberglass, polyethylene, or any other suitable abrasion-resistant material. In an embodiment, the tape 90 is placed over top of a tongue 92 of the retainer clip 88 and then wrapped around the busbar 78 to affix the retainer clip 88 relative to the busbar 78.

Figure 5:
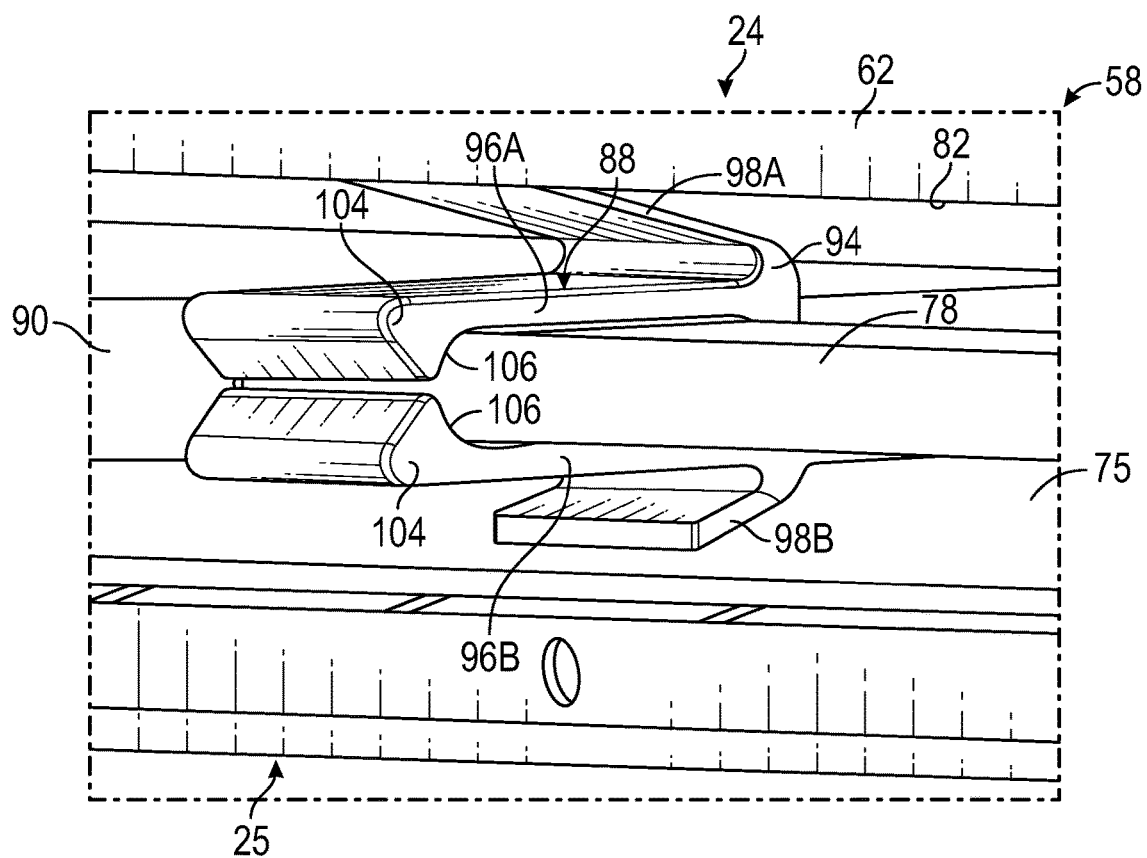
FIG. 5 illustrates a busbar retainer clip holding a busbar at a location inside a battery pack.
Figure 6:
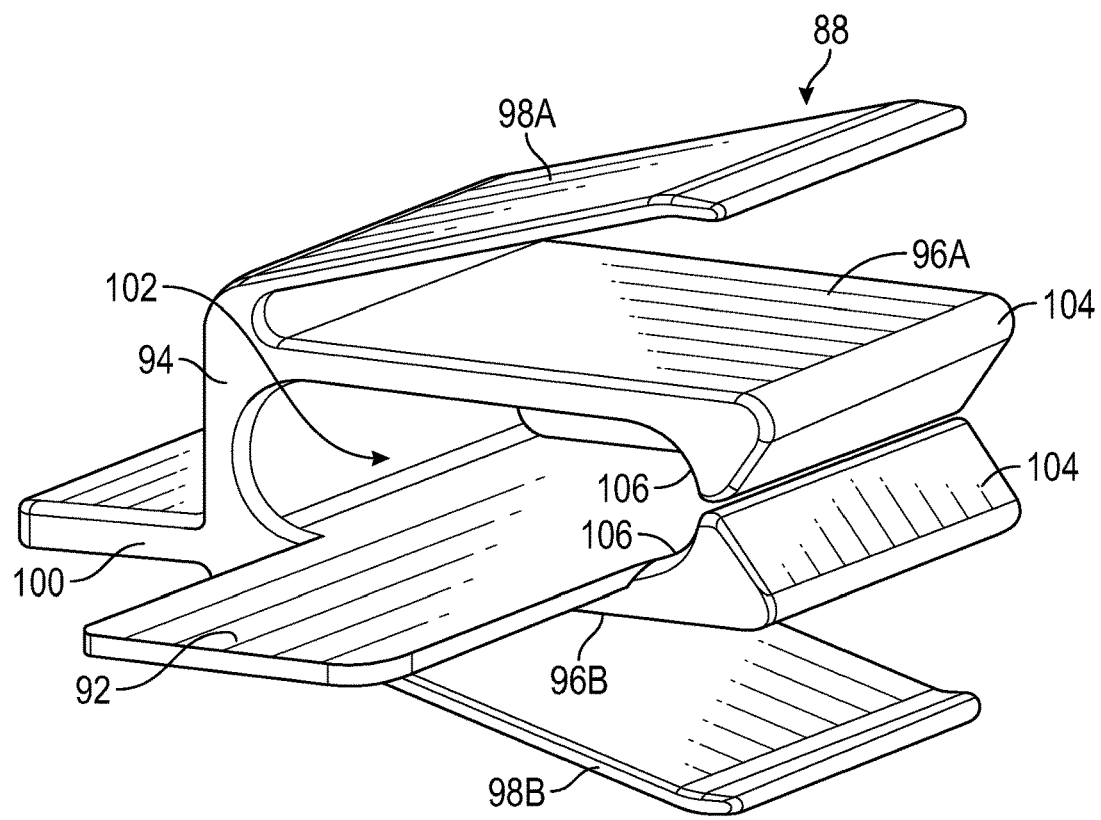
FIG. 6 is a side perspective view of an exemplary busbar retainer clip.
Figure 7:
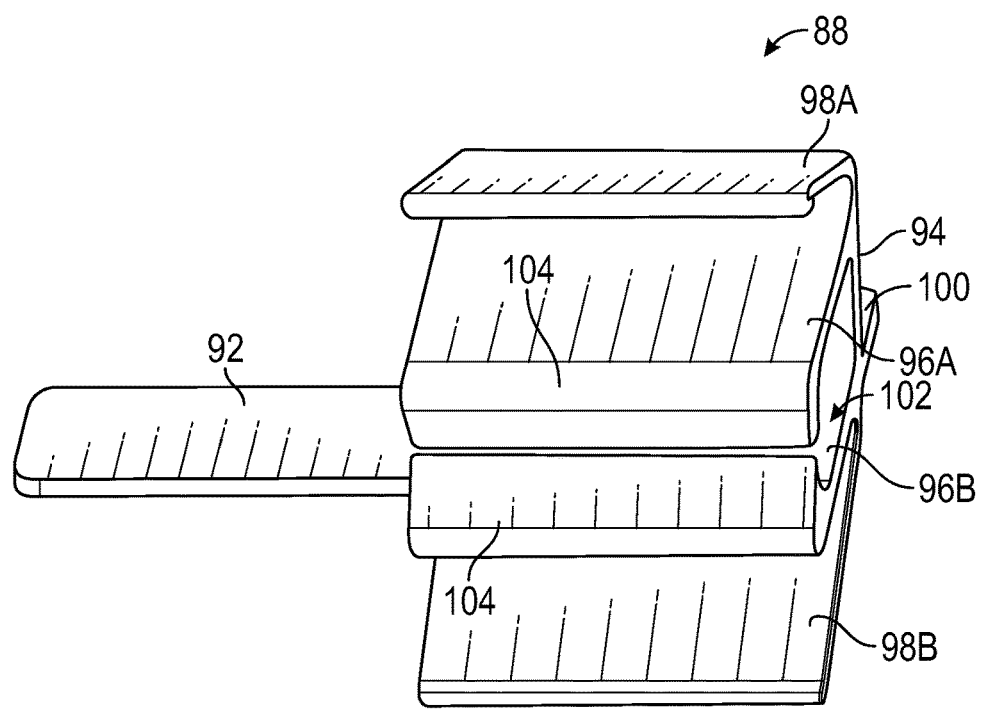
FIG. 7 is a front perspective view of an exemplary busbar retainer clip.

An exemplary retainer clip 88 is shown in further detail with reference to FIGS. 5-7. The retainer clip 88 may include a base 94, a pair of retention legs 96A, 96B, a pair of positioning legs 98A, 98B, and a handle 100. The retention legs 96A, 96B may protrude perpendicularly away from the base 94, and the positioning legs 98A, 98B may protrude transversely away from the base 94. In an embodiment, the retention legs 96A, 96B are located between the positioning legs 98A, 98B and are therefore flanked by the positioning legs 98A, 98B. The handle 100 may protrude from the base 94 in a direction opposite to the retention legs 96A, 96B and the positioning legs 98A, 98B.

The retention legs 96A, 96B may help hold the busbar 78 of the busbar assembly 72 at a desired position within the battery pack 24. In an embodiment, the busbar 78 is received within an open space 102 extending between the retention legs 96A, 96B of the retainer clip 88 to secure the busbar 78 in place.

The retention legs 96A, 96B may each include an outer gripping head 104 for securing the busbar 78 in pace within the open space 102. The outer gripping heads 104 may each include a curved surface 106 that extends about and matches a contour of at least a portion of an outer circumference of the busbar 78.

The positioning legs 98A, 98B help maintain a positioning of the retainer clip 88, and thus the busbar 78, relative to the cover 62 of the enclosure assembly 58 and the battery array 25. The first or upper positioning leg 98A of the pair of positioning legs may contact the inner surface 87 of the cover 62, and a second or lower positioning leg 98B of the pair of positioning legs may contact an upper surface 75 of the battery array 25 (best shown in FIG. 5). The positioning legs 98A, 98B may flex as the busbar 78 moves relative to the cover 62 and may help prevent material contact between the busbar 78 and the cover 62.

The tongue 92 of the retainer clip 88 may protrude laterally away from a side of one of the retention legs 96A, 96B. In an embodiment, the tongue 92 protrudes laterally away from a side of the lower retention leg 96B. In another embodiment, the tongue 92 is substantially flat and is generally rectangular shaped. The tongue 92 may be held against the busbar 78 by the tape 90 in order to secure the retainer clip 88 relative to the busbar 78 (see, e.g., FIGS. 4-5).

The retainer clip 88 may be made from various thermoplastic materials. In an embodiment, the retainer clip 88 is made of a nylon, such as poly (hexamethylene adipamide) (i.e., PA 66).

The exemplary battery packs of this disclosure include busbar assemblies that incorporate novel busbar retainer clips for retaining the busbars within the battery pack. The retainer clips may be made of a high voltage grade material and are configured to provide high impact protection and noise, vibration, and harshness reduction within battery packs in a compact, easy to assemble design.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly including a tray and a cover;

a battery array housed within the enclosure assembly;

a busbar positioned relative to the battery array; and a retainer clip including a pair of retention legs that receive the busbar, a first positioning leg that contacts the cover, and a second positioning leg that contacts the battery array, wherein the retainer clip includes a base, and the pair of retention legs protrude perpendicularly from the base, and the first and second positioning legs protrude transversely from the base, wherein a handle protrudes from the base in a direction opposite from the pair of retention legs and the first and second positioning legs.

2. The battery pack as recited in claim 1, wherein the busbar is a copper busbar having a silicone cover.

3. The battery pack as recited in claim 1, wherein the retainer clip is made of a thermoplastic material.

4. The battery pack as recited in claim 3, wherein the thermoplastic material includes nylon.

5. The battery pack as recited in claim 1, wherein the retainer clip is secured to the busbar by a tape.

6. The battery pack as recited in claim 5, wherein the tape is an abrasion-resistant tape made from polyurethane, fiberglass, or polyethylene.

7. The battery pack as recited in claim 5, wherein a tongue of the retainer clip is held against the busbar by the tape.

8. The battery pack as recited in claim 1, wherein each retention leg of the pair of retention legs includes an outer gripping head having a curved surface that extends about at least a portion of an outer circumference of the busbar.

9. The battery pack as recited in claim 1, comprising a second retainer clip affixed to the busbar and configured to secure the busbar relative to the battery array.

10. The battery pack as recited in claim 1 wherein the busbar is part of an electrical distribution system (EDS) of the battery pack.

11. The battery pack as recited in claim 1 wherein the first and second positioning legs are flexible portions of the retainer clip.

* * * * *